United States Patent [19]
Kohls et al.

[11] 3,901,346
[45] Aug. 26, 1975

[54] SAFETY BUMPER FOR A DRIVERLESS VEHICLE

[75] Inventors: James P. Kohls, Petoskey; Robert J. Borgman, Harbor Springs, both of Mich.

[73] Assignee: Jervis B. Webb Company, Detroit, Mich.

[22] Filed: Sept. 26, 1973

[21] Appl. No.: 400,786

[52] U.S. Cl. .................................. 180/96; 180/92
[51] Int. Cl. ...................... B60k 27/08; B60r 19/10
[58] Field of Search ........ 180/92, 94, 96; 293/71 R, 293/71 P; 200/52 R

[56] References Cited
UNITED STATES PATENTS

| | | | |
|---|---|---|---|
| 1,784,387 | 12/1930 | Postel | 180/92 |
| 1,925,763 | 9/1933 | Kirschen | 180/96 |
| 3,494,607 | 2/1970 | Rusch | 180/92 X |
| 3,599,744 | 8/1971 | Satterfield | 180/96 |
| 3,664,701 | 5/1972 | Kondur | 180/94 X |

FOREIGN PATENTS OR APPLICATIONS

| | | | |
|---|---|---|---|
| 1,162,176 | 9/1958 | France | 180/94 |

Primary Examiner—David Schonberg
Assistant Examiner—Terrance L. Siemens
Attorney, Agent, or Firm—Farley, Forster and Farley

[57] ABSTRACT

A safety bumper for a driverless vehicle consists of a bumper assembly including a resilient bumper member having a resilient tube mounted on the outer periphery thereof so as to be engageable with an obstacle. The tube is relatively more flexible than the bumper member, is vented to the atmosphere, and is in fluid communication with a switch operable in response to the increase in pressure in the tube which results when the bumper strikes an obstacle. Operation of the switch in turn operates a stopping control on the vehicle and causes the vehicle driving motor to be de-energized and the vehicle brakes to be applied.

10 Claims, 4 Drawing Figures

PATENTED AUG 26 1975  3,901,346
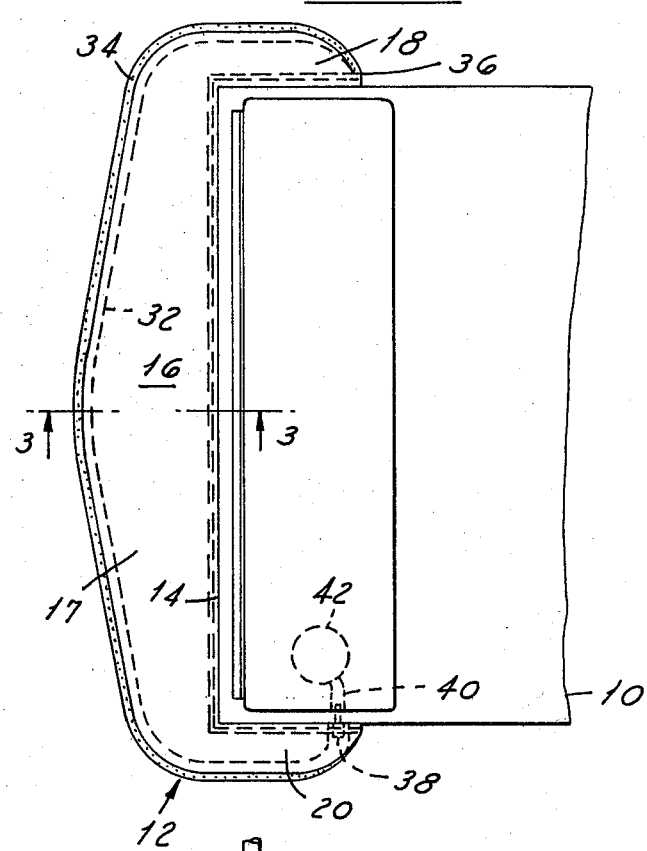
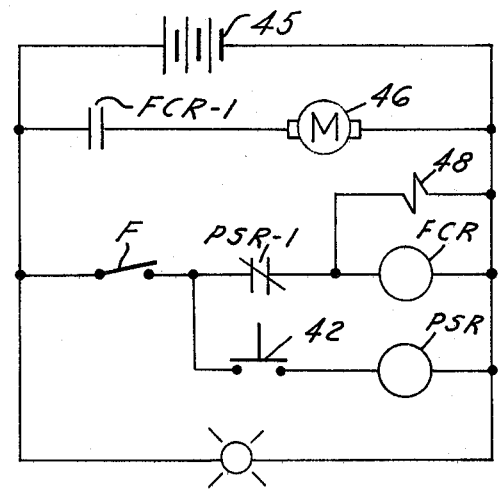
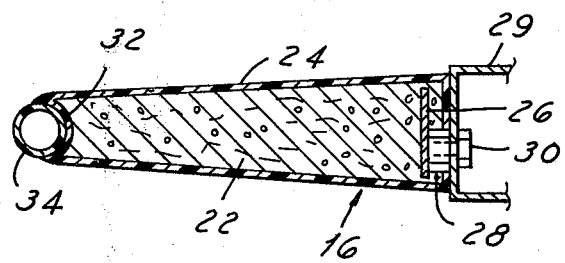
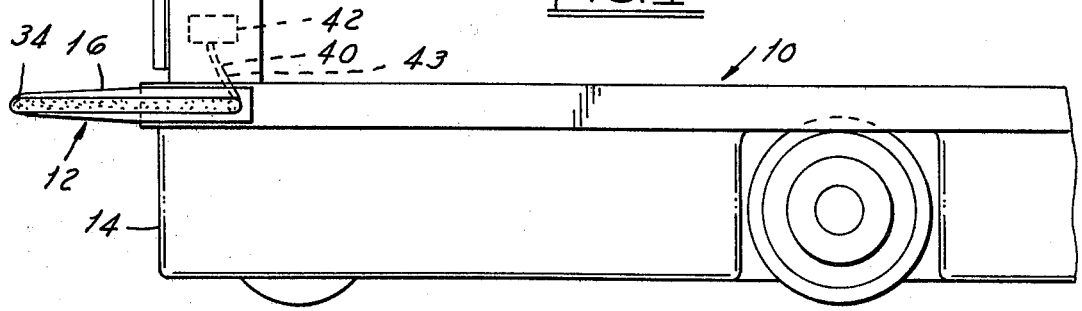

SAFETY BUMPER FOR A DRIVERLESS VEHICLE

SUMMARY OF THE INVENTION

Prior examples of safety bumpers for driverless vehicles have employed an electrical switch operable to stop the vehicle when the bumper is deflected, as disclosed in U.S. Pat. Nos. 2,920,713 and 3,496,317. In such prior constructions, if the bumper is sufficiently damaged or permanently deformed by striking an obstacle, the switch is also damaged, or at least will not operate properly unless the bumper is replaced or repaired. Bumper damage is a frequent occurrence in the operation of a driverless vehicle and has resulted in considerable expense and vehicle down time.

The present invention provides a safety bumper which offers improved resistance and tolerence to permanent damage, and which thereby materially reduces the need for bumper replacement or repair.

In accordance with the invention, a safety bumper for a driverless vehicle having control means operable to stop the vehicle in response to contact between the bumper and an obstacle, comprises a bumper assembly including a resilient bumper member, a resilient fluid conduit mounted on the outer periphery of the bumper member so as to be engageable with an obstacle, the flexibility of the fluid conduit being relatively greater than that of the bumper member; and, a control element operable in response to a change of fluid pressure in the fluid conduit, the control element being operatively connected with said control means.

The fluid conduit is in communication with the atmosphere through a vent acting as an orifice which permits fluid pressure in the conduit to increase as a result of abrupt contact between the bumper assembly and an obstacle, but which permits the pressure in the conduit to adjust to a permanent or gradual change in the volume thereof caused by any permanent deformation of the bumper assembly or expansion and contraction of the fluid.

Preferably the bumper member is of molded construction including a resilient interior and a relatively dense outer skin, and has a front portion and a pair of side portions that project outwardly of the vehicle and have a continuous outer periphery in which a mounting recess for the fluid conduit is provided.

Other features and advantages of the invention will appear from the description to follow of the embodiment disclosed in the accompanying drawings.

DESCRIPTION OF THE DRAWINGS

FIG. 1 is a side elevation showing a driverless vehicle equipped with the safety bumper of the invention;

FIG. 2 is a plan view showing the front portion of the vehicle of FIG. 1;

FIG. 3 is an enlarged sectional elevation taken as indicated by the line 3—3 of FIG. 2; and, FIG. 4 is a schematic diagram of an electrical control circuit operable in response to deflection of the safety bumper.

DESCRIPTION OF THE PREFERRED EMBODIMENT

Referring to FIGS. 1 and 2, a self-propelled driverless vehicle 10 is equipped with a safety bumper assembly 12 mounted on the front end 14 of the vehicle. The bumper assembly 12 includes a resilient bumper member 16 having a front portion 17 and a pair of side portions 18 and 20 suitably formed to fit about the front end 14 of the vehicle and project outwardly thereof.

As best shown in FIG. 3, the bumper member 16 is of molded construction which includes a resilient polyurethane foam interior 22 and a relatively dense polyurethane outer skin 24, the interior 22 being molded about an attachment plate 26 provided with threaded sockets 28 extending through the skin 24, and the bumper member 16 is attached to a frame member 29 on the front end 14 of the vehicle by bolts 30 engaging the sockets 28.

In designing the bumper assembly 12 for a particular vehicle, the bumper member 16 is so proportioned and the material employed in the construction thereof so selected that the bumper member 16 is resiliently deformable within the normal stopping distance of the vehicle, at least with respect to that portion of the bumper member 16 which is located on the longitudinal center line of the vehicle and is subject to a head-on collision. In other words, the bumper member 16 is designed to withstand without permanent damage or deformation the impact that can be expected in the operation of a driverless vehicle.

A semi-circular recess 32 is formed in the outer periphery of the bumper member 16 and a fluid conduit or tube 34 is mounted in this recess and is suitably attached to the bumper member 16. This tube 34 is formed of a resilient material such as neoprene or polyurethane, is sealed at one end 36 and is provided with a fitting 38 at the other end for fluid communication through a tube 40 to a fluid operable control element or pressure switch 42 mounted within an enclosure or control pedestal 44 at the front of the vehicle 10. Vent means 43 connect the interior of the tube 34 to atmosphere, and is preferably provided in the tube 40 so that the enclosure 44 protects the vent means 43 and also the pressure switch 42 from being effected by the dust, dirt and other contamination ordinarily expected in the operation of a driverless industrial vehicle.

The conduit 34 acts primarily as a collision sensing element, although it also functions as a buffer for the periphery of the bumper member 16. A greater degree of flexibility is provided in the material of the tube 34 than in the material of the bumper member 16 in order to insure that any portion of the tube 34 which contacts an obstacle will collapse before a substantial deformation of the resilient bumper member 16 takes place, and will thus cause an increase or surge of pressure to be exerted upon the pressure switch 42. The vent means 43, which acts as an orifice, will not permit such a surge of pressure to escape to the atmosphere, but instead acts to equalize the pressure within the tube 34 with the atmospheric pressure over a relatively longer period of time and compensates for changes in temperature, for changes in barometric pressure and for changes in internal volume of the tube 34 such as may result from permanent damage or set to the tube 34 or to the bumper member 16 in service.

In the simplified electric control diagram shown in FIG. 4, a manual control switch F, when closed, completes a citcuit from a battery 45 through a forward control relay FCR having a contact FCR-1 which closes and in turn completes a circuit through a drive motor 46 for the vehicle 10. Simultaneously, a brake release coil 48 is energized and the vehicle can proceed. The pressure switch 42 is connected in parallel with the forward control relay FCR in a circuit through a pressure switch relay PSR having a normally closed contact PSR-1 in series with the circuit through the brake release coil 48 and forward control relay FCR.

Immediately upon collision of the bumper assembly 12 with an obstacle, the pressure switch 42 is actuated by the surge or increase of fluid pressure in the tube 34 as a portion thereof deflects upon impact. Actuation of the pressure switch 42 energizes the pressure switch relay PSR, and the normally closed contact PSR-1 opens thus disconnecting the forward control relay FCR and the drive motor 46, and de-energizing the brake release coil 48 to automatically apply the brakes. When the vehicle is disengaged from the obstacle, the bumper assembly 12 will normally return to its original shape including the original fluid volume of the tube 34. However, if permanent deformation of the bumper assembly has been caused by the collision, the ability of the tube 34 to act as a sensing element capable of causing the vehicle to stop in the event of a subsequent collision will not be impared as long as the tube 34 has not been ruptured. The vent means 43 will permit the tube to adjust to a change in volume caused by permanent deformation without impairing the ability of the tube to produce the surge of pressure for operating the pressure switch 42.

Thus, the present safety bumper operates in response to a pressure change or to the rate of deformation, not to the fact of deformation of the bumper assembly.

We claim:

1. A safety bumper for a driverless vehicle having control means operable to stop the vehicle in response to contact between the bumper and an obstacle, wherein the improvement comprises:
   a bumper assembly including a bumper member formed of resiliently deformable foam-like material having a substantially uniform sectional composition and deformability, said bumper member having a continuous outer periphery;
   a collision sensing element mounted on said outer periphery of the bumper member for engagement with an obstacle, said sensing element comprising a resilient fluid conduit having a flexibility relatively greater than that of the bumper member so as to be deformable and create a change in the fluid pressure to said fluid conduit prior to substantial deformation of the bumper member on contact between the bumper assembly and an obstacle, and,
   a control element operable in response to said change in the fluid pressure in said fluid conduit, the control element being operatively connected with said control means.

2. A safety bumper according to claim 1 including vent means in fluid communication with said fluid conduit and the atmosphere.

3. A safety bumper according to claim 2 wherein said control element is a pressure switch.

4. A safety bumper according to claim 3 wherein said vehicle includes an enclosure and said vent means and pressure switch are mounted therein.

5. A safety bumper according to claim 1 wherein said control means comprises an electric circuit including a vehicle drive motor, a brake control, and relay means operable to cause the vehicle to stop in response to operation of said control element.

6. A safety bumper according to claim 1 where said bumper member is of molded construction.

7. A safety bumper according to claim 6 wherein said bumper member is capable of resilient deformation within the normal stopping distance of the vehicle.

8. A safety bumper according to claim 6 wherein the bumper member is provided with a recess in the outer periphery thereof, the fluid conduit being mounted in the recess.

9. A safety bumper according to claim 1 wherein said bumper member is of molded construction including a resilient interior and a relatively dense outer skin.

10. A safety bumper according to claim 1 wherein said bumper member includes a front portion and a pair of side portions projecting outwardly of the vehicle.

* * * * *

UNITED STATES PATENT OFFICE
CERTIFICATE OF CORRECTION

PATENT NO. : 3,901,346

DATED : August 26, 1975

INVENTOR(S) : James P. Kohls and Robert J. Borgman

It is certified that error appears in the above—identified patent and that said Letters Patent are hereby corrected as shown below:

Column 4, line 4, after the word "pressure" change "to" to read --in--.

Signed and Sealed this twenty-fifth Day of November 1975

[SEAL]

Attest:

RUTH C. MASON
*Attesting Officer*

C. MARSHALL DANN
*Commissioner of Patents and Trademarks*